United States Patent
Sun et al.

(10) Patent No.: US 11,435,743 B2
(45) Date of Patent: Sep. 6, 2022

(54) THROWABLE UNMANNED AERIAL VEHICLE AND METHOD OF OPERATION

(71) Applicant: SZ DJI TECHNOLOGY CO., LTD., Shenzhen (CN)

(72) Inventors: Xubin Sun, Shenzhen (CN); Dajun Huo, Shenzhen (CN); Hao Yang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 254 days.

(21) Appl. No.: 16/812,965

(22) Filed: Mar. 9, 2020

(65) Prior Publication Data

US 2020/0218265 A1    Jul. 9, 2020

Related U.S. Application Data

(63) Continuation of application No. PCT/CN2017/101388, filed on Sep. 12, 2017.

(51) Int. Cl.
| | | |
|---|---|---|
| *G05D 1/00* | (2006.01) | |
| *B64C 39/02* | (2006.01) | |
| *B64D 47/08* | (2006.01) | |
| *G05D 1/04* | (2006.01) | |
| *G05D 1/08* | (2006.01) | |

(52) U.S. Cl.
CPC ......... *G05D 1/0094* (2013.01); *B64C 39/024* (2013.01); *B64D 47/08* (2013.01); *G05D 1/042* (2013.01); *G05D 1/0808* (2013.01); *B64C 2201/027* (2013.01); *B64C 2201/08* (2013.01); *B64C 2201/127* (2013.01); *B64C 2201/146* (2013.01)

(58) Field of Classification Search
CPC .... G05D 1/0094; G05D 1/042; G05D 1/0808; B64C 39/024; B64C 2201/027; B64C 2201/08; B64C 2201/127; B64C 2201/146; B64D 47/08
See application file for complete search history.

(56) References Cited

U.S. PATENT DOCUMENTS 9,612,599 B2 * 4/2017 Bradlow ................ G05D 1/102
9,632,501 B1 * 4/2017 Yang ....................... G06F 3/017
(Continued)

FOREIGN PATENT DOCUMENTS

| CN | 104685436 A | * | 6/2015 | ........... G05D 1/0676 |
| CN | 104685436 A | | 6/2015 | |

(Continued)

OTHER PUBLICATIONS

Guiqing Li, et al., A Comparative Study of Chinese and Korean Enterprises Catching Up With Innovation, Oct. 2016, pp. 388-405, University of Electronic Science and Technology Press, China.

(Continued)

*Primary Examiner* — Peter D Nolan
*Assistant Examiner* — Kenneth M Dunne
(74) *Attorney, Agent, or Firm* — Anova Law Group, PLLC

(57) ABSTRACT

An operation method includes sensing, by a movable device, whether the movable device is thrown out by a thrower; in response to a sensing of being thrown out, controlling the movable device to hover in air; and after controlling to hover, performing, by the movable device, an aerial operation of the movable device, such as capturing images.

18 Claims, 4 Drawing Sheets

(56) References Cited

U.S. PATENT DOCUMENTS

| | | | |
|---|---|---|---|
| 9,696,725 B2* | 7/2017 | Wang | A63H 27/12 |
| 2011/0147515 A1 | 6/2011 | Miller | |
| 2016/0101856 A1* | 4/2016 | Kohstall | B64C 39/028 244/17.13 |
| 2016/0304217 A1* | 10/2016 | Fisher | B64F 1/222 |
| 2016/0313742 A1* | 10/2016 | Wang | A63H 27/12 |
| 2017/0036771 A1* | 2/2017 | Woodman | B64C 25/54 |
| 2017/0197731 A1* | 7/2017 | Yang | G05D 1/0669 |
| 2018/0067498 A1* | 3/2018 | Wang | G05D 1/0669 |
| 2019/0250640 A1* | 8/2019 | O'Flaherty | G05D 1/042 |

FOREIGN PATENT DOCUMENTS

| | | |
|---|---|---|
| CN | 104808680 A | 7/2015 |
| CN | 105159321 A | 12/2015 |
| CN | 105527972 A | 4/2016 |
| CN | 105930047 A | 9/2016 |
| CN | 106647805 A | 5/2017 |
| JP | 2018078433 A * | 5/2018 |
| WO | WO-2016172260 A1 * | 10/2016 ........... G08G 5/0026 |
| WO | WO-2021016875 A1 * | 2/2021 |

OTHER PUBLICATIONS

Xudong Wang, et al., Enjoy Our Sky: The Aviation Culture and General Aviation, Oct. 2014, pp. 197-208, Aviation Industry Press, China.

Juntong Qi et al., UAV Transmission Line Inspection and Erection Technology, Nov. 2014, pp. 93-97, Northeastern University Press, China.

Gang Wan et al., Unmanned Aerial Vehicle Surveying and Mapping Technology and Application, Dec. 2015, pp. 159-187, Surveying and Mapping Publishing House, China.

Qiwei Dong et al., Entrepreneurship Information Application Technology, Feb. 2017, pp. 206-236, Shanghai Jiaotong University Press, China.

The World Intellectual Property Organization (WIPO) International Search Report for PCT/CN2017/101388 dated Mar. 15, 2018 7 pages.

Chuangye Emu (A Chinese Sample of the Sharing Economy), Jan. 2016, pp. 159-161, Modern Press, Beijing, China.

* cited by examiner

THROWABLE UNMANNED AERIAL VEHICLE AND METHOD OF OPERATION

CROSS-REFERENCE TO RELATED APPLICATION

This application is a continuation of International Application No. PCT/CN2017/101388, filed Sep. 12, 2017, the entire content of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure generally relates to the field of remote control and, more particularly, relates to a movable device and an operation method thereof.

BACKGROUND

A movable device, such as a selfie drone equipped with an image capturing device, typically uses a battery as the energy source. As an unmanned aerial vehicle (UAV), a selfie drone usually needs to achieve two characteristics: one is desired portability (for example, small size and light weight); the other is a long battery life (for example, capable of taking a great number of pictures after each time of charging). However, these two features may contradict each other. Usually, the battery accounts for most of the weight of the UAV. Therefore, in order to make the UAV smaller and lighter, the weight of the battery may need to be reduced; however, when a longer battery life is desired, the weight of the battery may increase.

At present, a UAV relies entirely on battery to provide power in the air. In addition, a UAV may only be able to take off and land on a flat ground. When photography is needed, the UAV may need to be placed on the ground, and may take off through remote control. After capturing the images, the UAV may then land on the ground through remote control. In such a case, it may only take a few seconds to capture an image, but the preparation for capturing images (for example, controlling the plane to take off, adjusting the position and posture, and landing) may take tens of seconds, and thus it may not be possible to take pictures quickly. In addition, the take-off and landing process requires more power, and as a result, the battery may only be able to support taking fewer pictures after each time of charging. Moreover, because the UAV can only take off from a flat ground, it is difficult to take pictures when the ground is not flat.

The disclosed movable device and operation method are directed to solve one or more problems set forth above and other problems in the art.

SUMMARY

One aspect of the present disclosure provides an operation method of a movable device. The operation method includes sensing, by the movable device, whether the movable device is thrown out by a thrower; in response to a sensing of being thrown out, controlling the movable device to hover in air; and after controlling to hover, performing, by the movable device, an aerial operation of the movable device.

Another aspect of the present disclosure provides a movable device. The movable device includes a first sensing device, configured to sense whether the movable device is thrown out by a thrower; a controller, configured to generate a control signal, after receiving a signal indicating that the movable device is thrown out from the first sensing device; and a power output component, configured to make the movable device hover according to the control signal after the movable device is thrown out.

Other aspects of the present disclosure can be understood by those skilled in the art in light of the description, the claims, and the drawings of the present disclosure.

BRIEF DESCRIPTION OF THE DRAWINGS

In order to more clearly illustrate the technical solutions in the embodiments of the present disclosure, the drawings that need to be used in the description of the embodiments will be briefly described below. It is obvious that the drawings in the following description are some embodiments of the present disclosure, and for those of ordinary skill in the art, other drawings may also be obtained according to these drawings without any creative effort.

Figure 1:
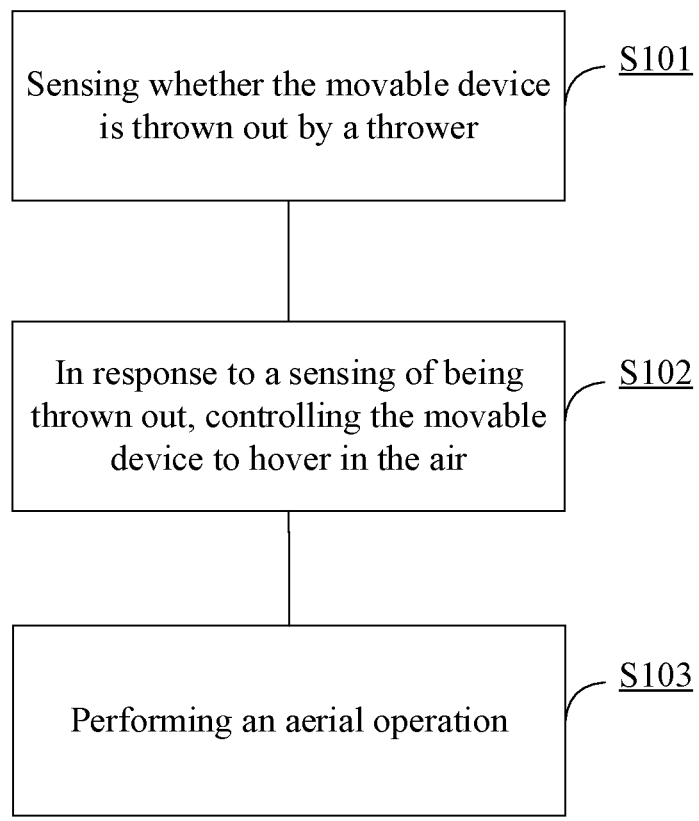
FIG. 1 illustrates a schematic flowchart of an exemplary operation method of a movable device according to various embodiments of the present disclosure.

It should be noted that the drawings are not necessarily illustrated to scale, but are merely shown in a schematic way.

DETAILED DESCRIPTION OF THE EMBODIMENTS

In the following, the technical solutions in the embodiments of the present disclosure will be clearly described with reference to the accompanying drawings in the embodiments of the present disclosure. It is obvious that the described embodiments are only a part of the embodiments of the present invention, but not all of the embodiments. All other embodiments obtained by those skilled in the art based on the embodiments of the present disclosure without creative efforts are within the scope of the present disclosure.

It should be noted that when a component is referred to as being "fixed" to another component, it can be directly on the other component or an intermediate component may be present. When a component is considered as "connected to" another component, it can be directly connected to another component or both may be connected to an intermediate component.

All technical and scientific terms used herein have the same meaning as commonly understood by one of ordinary skill in the art to which this disclosure belongs, unless otherwise defined. The terminology used in the description of the present disclosure is for the purpose of describing particular embodiments and is not intended to limit the disclosure. The term "and/or" used herein includes any and all combinations of one or more of the associated listed items.

Some embodiments of the present disclosure are described in detail below with reference to the accompanying drawings. The features of the embodiments and examples described below can be combined with each other without conflict.

The present disclosure provides a movable device and an operation method. The operation method may be applied to the movable device. I one embodiment, the movable device may be an airborne movable device, such as a fixed-wing aircraft (e.g., an airplane or a glider), a rotorcraft (e.g., a helicopter), or other aircraft (e.g. a soft airship or a balloon). In other embodiments, the movable device may be a pole (e.g., a fishing rod, or other types of movable supports or frames), or a movable device in space (e.g., a satellite, a space station, or a spacecraft).

The movable device may be able to move freely in an environment (e.g., in the air or in space), or move along a preset path or orbit, or in an agreed manner. The movable device may be moved in an environment with one, two, or three dimensions. That is, the moving trace of the movable device may be one dimensional, two dimensional, or three dimensional in the air or in space. Instead of moving manually, the movable device may move automatically in response to a signal. In some embodiments, the movable device may be a vehicle, such as a vehicle in the air or a vehicle in space, or a combination of the two. The vehicle may be able to move freely in one or more specified environments, or along a fixed path.

The vehicle may include a power system. The power system may utilize electric motors, engines, electronic components, magnetic mechanisms, gravity, wind, combustion, and/or other power mechanisms. In some embodiments, a manual power system, a human power system, or a power system by means of other living organisms may also be applied to a movable device, such as a vehicle. In some embodiments, the movable device may be a rotorcraft, which may be driven or controlled by the rotation of one or more blades. The movable device may be driven or repositioned by means of one or more rotating blades, propellers, wheels, magnets, orbits, or other mechanisms. In some embodiments, the movable device is an unmanned vehicle, such as an unmanned aerial vehicle (UAV). A UAV may be able to hover, reorient, and/or keep following an object (for example, when the UAV is thrown out by a moving thrower, the UAV may be able to follow the thrower to move).

The movable device may be controlled automatically or remotely without the need for a person in or on the movable device. The movable device may be remotely operated through a terminal. Alternatively, a person may be in or on the movable device to assist the control of the movable device. The movable device may be configured to carry loads. In some embodiments, the load carried by the movable device may include a loading item and/or a carrier. The carrier may be capable of moving a loading item relative to the movable device.

An image capturing device according to the present disclosure may refer to an electronic device capable of recording images, videos, and/or audios. The image capturing device may include, but not limited to, a video camera, a mobile phone, a tablet computer, a webcam, a camera, or an X-ray/infrared imager. According to the function, the image capturing device may be a planar-image capturing device, a stereoscopic-image capturing device, and a panoramic-image capturing device. According to the number of lenses, the panoramic image capturing device may be a single-lens image capturing device or a multi-lens image capturing device.

A thrower in the present disclosure may refer to an actor capable of pushing a movable device to be thrown out. The thrower may be a person, an animal, a robot, or a throwing device that is capable of ejecting or projecting a throwing object, e.g. a movable device. In one embodiment, as a thrower, a person may support a movable device by hand, and by lifting the movable device upward or obliquely upward, a corresponding throw (i.e., a throw operation) may be realized.

In the present disclosure, the term "hover" or "hovering" may refer to a movable device staying in the air. The hovering time may be short (for example, about 1 second), or may be long (for example, more than 10 minutes), depending on subsequent operations. When the subsequent operations can be performed at the current location and do not need to move, the hovering status may be kept longer; when subsequent operations need the position to be adjusted (such as adjusting the angle and distance of image recording), the hovering status may be maintained for a short time (even the hover time is maintained below 1 s).

The ordinal numbers used in the present disclosure, such as "first", "second", etc., are used to represent different types of sensing devices and the like, and themselves do not indicate or represent that the corresponding sensing devices and the like have any ordinal numbers in front. Moreover, these ordinal numbers do not represent that a certain sensing device and another sensing device or the like are arranged in a specific order. The use of these ordinal numbers is merely to distinguish a sensing device with a certain name from another sensing device with the same name. In some embodiments, the sensing devices containing different ordinal numbers may have a same type or may even be the same element.

In the present disclosure, the term "operation method" may refer to a movable device realizing a corresponding task by performing a corresponding action. The operation method may mainly include an aerial operation, including but not limited to, throwing a first item (such as jetting or spraying a liquid, a solid, or a liquid-solid mixture) in the air, capturing images and/or recording videos in the air, and fetching a second item in the air. In addition, the operation method may also include an assistant operation for the aerial operation, including but not limited to, the movable device moving to the position for the aerial operation, and landing to the ground or back to the thrower after completing the aerial operation.

It should be noted that, although the following embodiments are described using a UAV as an example of the movable device, a person as an example of the thrower, and photography as an example of the aerial operation, the present disclosure is not limited to the embodiments provided here. In actual applications, the movable device may be in any of the forms described above, and the thrower may be any appropriate actor capable of implementing the action of throwing the movable device.

As mentioned above, the internal battery of a movable device may only be able to support an aerial operation for a limited amount of time. For example, the battery may only support capturing a small number of pictures after being charged each time, may be unable to take pictures quickly, and may need a flat ground for taking off and landing.

In order to at least partially solve or alleviate the problems mentioned above, an operation method of a movable device is provided. For example, when taking off to a position (such as a position for capturing images or recording videos) to perform an aerial operation, the movable device may be thrown into the air with a certain force according to a throw operation as described in various embodiments of the present disclosure. The movable device may thus use the work performed on it (the inertia collected through the throw) as part of the power to fly. The movable device may turn on the rotor in the air to maintain the flight posture and fly along the direction in which the movable device is thrown. After the kinetic energy gained from the throw operation is consumed (for example, the kinetic energy gained from the throw operation is maximally converted into the potential energy as the movable device rises up), the movable device may hover in the air to perform the aerial operation (such as capturing images or recording videos).

Figure 5:
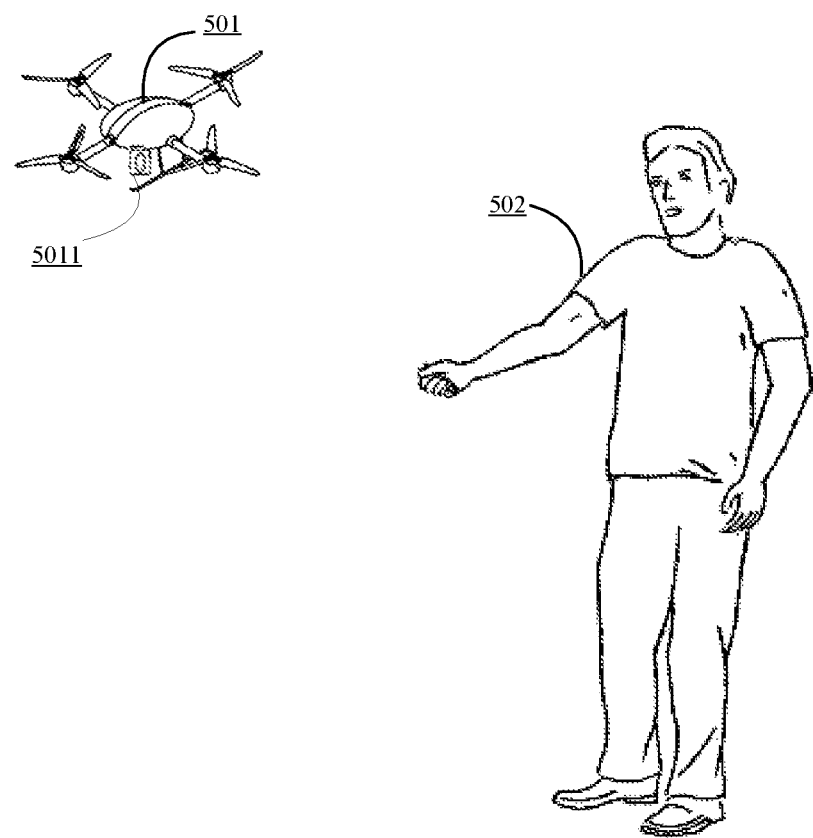
FIG. 5 illustrates a schematic diagram of hovering and performing an aerial operation in an exemplary operation method of a movable device according to various embodiments of the present disclosure.

In the following, an exemplary process of an operation method of a movable device (such as a UAV) according to various embodiments of the present disclosure will be described in detail with references to FIGS. 1-2 and FIG. 5.

FIG. 1 illustrates a schematic flowchart of an exemplary operation method of a movable device according to various embodiments of the present disclosure. Referring to FIG. 1, the operation method of the movable device may include the following exemplary steps.

In S101, the movable device may sense whether itself is thrown out by a thrower.

In S102, when sensing being thrown out, the movable device may be controlled to hover in the air; and In S103, after controlling the movable device to hover, the movable device performs an aerial operation.

In some embodiments, the sensing whether the movable device is thrown out by the thrower in S101 may be implemented in various ways. One implementation method is to sense whether the movable device is far away from the thrower. In this case, a first sensing device for sensing the distance between the thrower and the throwing object may be mounted on the movable device. The first sensing device may be an ultrasonic sensor, an infrared sensor, and/or an optical flow sensor. The first sensing device may be mounted on the movable device to detect the distance between the moving device and the thrower. When the distance changes and the changed value exceeds a certain distance threshold, it may be determined that the movable device is thrown out by the thrower. In one embodiment, the first sensing device, including the ultrasonic sensor, the infrared sensor, and/or the optical flow sensor, may be located inside the movable device or disposed on an outer casing of the movable device to facilitate sensing the distance.

Similarly, another implementation method may also include sensing a distance value, the only difference is that the change in the distance between the movable device and the ground may be detected. Correspondingly, a first sensing device may also be disposed in the movable device, and the first sensing device may also be an ultrasonic sensor, an infrared sensor, and/or an optical flow sensor.

According to another implementation method, whether an interaction force exists between the movable device and the thrower may be sensed and determined. The method may be implemented by a pressure sensor. That is, the first sensing device may be a pressure sensor. For example, the pressure sensor may be disposed on the outer surface of the movable device. Before the movable device is thrown out, the thrower may give the movable device a supporting force or a gripping force, and the pressure sensor may thus sense a corresponding force. After the movable device is thrown out, the interaction force between the thrower and the movable device may disappear, and thus the change may be detected by the pressure sensor in time.

In one embodiment, the pressure sensor may be disposed on the lower surface of the movable device, and thus when the thrower throws out the movable device, the pressure sensor may be able to sensitively detect that the support force disappears.

Figure 2:
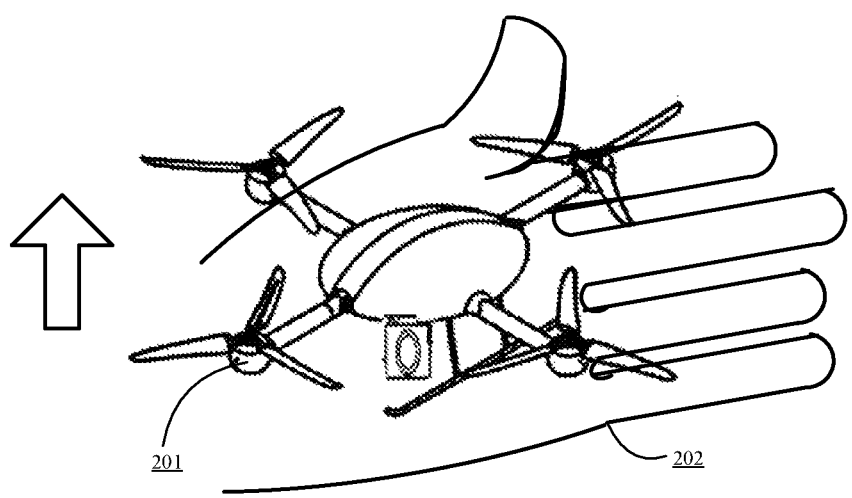
FIG. 2 illustrates a schematic diagram of a throw operation according to various embodiments of the present disclosure.

FIG. 2 illustrates a schematic diagram of a throw operation according to various embodiments of the present disclosure. Referring to FIG. 2, the thrower may be a person, and before the movable device 201 is thrown out, the movable device 201 may be located in a hand 202 of the person. The person may throw the movable device 201 in a direction indicated by an arrow in the figure. The throwing direction may be straight upward or obliquely upward. In one embodiment, the throwing direction may be a direction towards the position of the movable device 201 for performing subsequent operations (such as capturing images or recording videos).

In some embodiments, the thrower may be an animal, a robot, or a mechanical throwing device. When the thrower is a robot, the robot may calculate the corresponding throwing force and throwing angle more accurately based on a plurality of internal sensing devices. As such, the movable device may be able to accurately reach the position for the subsequent aerial operation.

Further, referring to FIG. 1, in S102, when sensing that the movable device is thrown out, the movable device may control itself to hover in the air. As for the time to hover, the movable device may control itself to hover when a corresponding condition is satisfied.

In one embodiment, the movable device may hover after sensing that the height of the movable device no longer rises. The determination of whether this condition is satisfied may be achieved by a second sensing device. The second sensing device may be an ultrasonic sensor, an infrared sensor, or an optical flow sensor, and may be mounted on the movable device to sense whether the height of the movable device no longer rises. The second sensing device may be configured to perform height sensing at a certain frequency. The second sensing device can sense the height relative to the ground or the height relative to the thrower. At the operation frequency of the second sensing device, when the height of the next sensing value is less than or equal to the height of the previous sensing value, it may be determined that a hovering condition is satisfied. Due to the uncertainty or mobility of the thrower, the bottom surface may be selected as a reference for height sensing and measurement.

In another embodiment, the movable device may hover after detecting that the component of the velocity of the movable device in the height direction is 0. The determination of whether this condition is satisfied may be achieved by a second sensing device. In this case, the second sensing device may be a speed sensor and an acceleration sensor, and may be configured to detect whether the component of the velocity of the movable device in the height direction is zero. The speed sensor may measure a linear velocity or an angular velocity, and an acceleration sensor may be configured to measure linear acceleration.

In another embodiment, the movable device may sense whether a hovering control signal is received from an external control terminal. The determination of whether this condition is satisfied may be achieved by a second sensing device. In this case, the second sensing device may be an external signal receiving device. The external signal receiving device may be electrically coupled to a controller, and when receiving a hovering signal from an external control terminal, the received hovering signal may be transmitted to the controller, and the controller may control a corresponding power output component to perform the hovering operation.

As mentioned above, the hovering time may be short (for example, about 1 s), or may be long (for example, more than 10 minutes), depending on the strength and angle that the thrower uses to throw the movable device. After being thrown out, when the movable device reaches the highest point, that is, the position for the aerial operation, the movable device may hover until the end of the operation. When the throwing force is not enough or the throwing force is overly strong, the movable device may also be able to adjust its own position through the power output component, and thus the hovering time may be short.

In some embodiments, the hovering condition may be the movable device sensing that the height of the movable no longer rises based merely on the throwing momentum, and when the hovering condition is satisfied, the movable device may control itself to hover. The effect of this condition is that the movable device can be brought to the height required for performing the aerial operation without the need for additional power generated by the power output component of the movable device. As such, power loss may be reduced and a longer service life may be achieved (especially for a small unmanned aerial vehicle, when equipped with a limited energy supply device, aerial operations, including but not limited to capturing images, may be performed for a longer time).

Further, referring to FIG. 1. The aerial operations of the movable device in various embodiments of the present disclosure may further include S103: when or after the movable device controls itself to hover, the movable device may perform an aerial operation. FIG. 5 illustrates a schematic diagram of hovering and performing an aerial operation in an exemplary operation method of a movable device according to various embodiments of the present disclosure.

A movable device, such as a UAV, moves to the air to achieve a series of corresponding functions, which may include but are not limited to throwing a first item (such as jetting or spraying a liquid, a solid, or a liquid-solid mixture) in the air, capturing images and/or recording videos in the air, and fetching a second item in the air. The operations mentioned above can all be referred to as aerial operations. Taking the control of capturing images as an example, a wider and more peculiar field of view can be obtained through an overlooking angle, thereby meeting the corresponding needs of users.

In the following, an exemplary process of another operation method of a movable device (such as a UAV) according to various embodiments of the present disclosure will be described in detail with reference to FIGS. 3-5.

Figure 3:
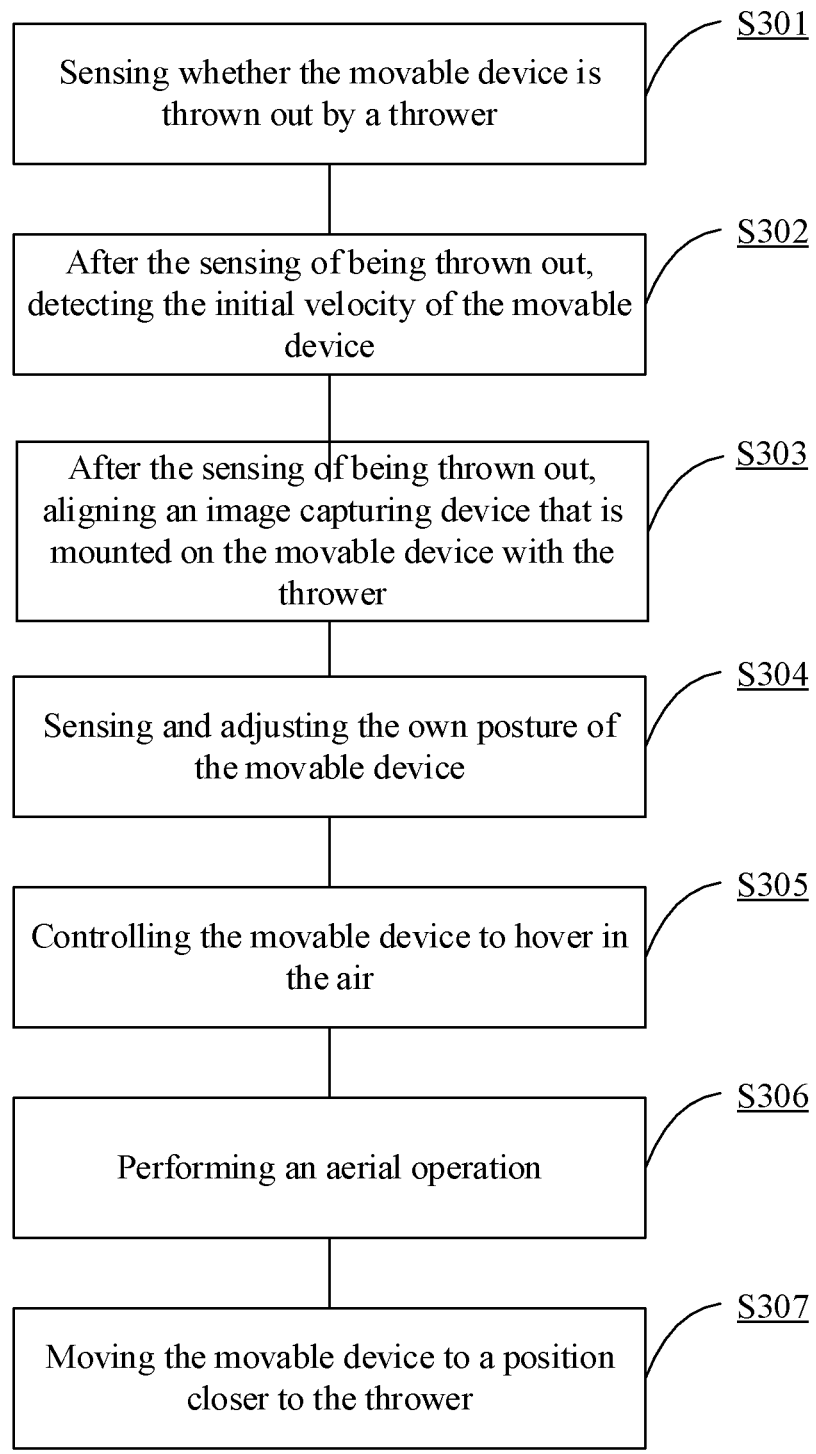
FIG. 3 illustrates a schematic flowchart of another exemplary operation method of a movable device according to various embodiments of the present disclosure.

FIG. 3 illustrates a schematic flowchart of another exemplary operation method of a movable device according to various embodiments of the present disclosure. Referring to FIG. 3, the operation method of the movable device may include the following exemplary steps.

In S301, the movable device may sense whether it is thrown out by a thrower.

In S305, when sensing being thrown out, the movable device may be controlled to hover in the air; and In S306, after controlling the movable device to hover, the movable device performs an aerial operation.

For the detailed description of S301 and S305, reference may be respectively made to S101 and S102 described above, and the details are not described herein again.

In some embodiments, after performing S301, the method may further include S302: after the sensing of being thrown out, the movable device may detect an initial velocity at the time being thrown out. The initial velocity may be used to provide conditions for subsequent hovering in S304 and S306. For example, the value of the initial velocity, the direction of the initial velocity, and the direction of the movable device relative to the thrower (e.g. the throwing angle) may be sensed. The subsequent hovering time and returning to the thrower may also depend on the speed and the direction of the throw operation (that is, relative to the direction of the thrower).

In some embodiments, measuring the initial velocity may be implemented by a third sensing device. The third sensing device may be a speed sensor, an acceleration sensor, and/or an inertial sensor, and the third sensing device may detect the value of the initial velocity, the direction of the initial velocity, and the throwing angle relative to the thrower. The speed sensor may measure a linear velocity or an angular velocity, and an acceleration sensor may be used to measure linear acceleration. It should be noted that, in this case, the third sensing device may have the same components as the second sensing device, but the sensing time (operation time) may be different. Therefore, a sensing device may be multiplexed as the third sensing device and the second sensing device within the movable device, that is, only one speed sensor and one acceleration sensor may need to be disposed in the movable device.

In some embodiments, referring to FIG. 3, the method may further include S303: after the sensing of being thrown out, an image capturing device that is mounted on the movable device may be aligned with the thrower (for example, the lens of the image capturing device may be adjusted to focus on a part of the thrower or an entire body of the thrower).

In some embodiments, aligning the image capturing device that is mounted on the movable device with the thrower may include: determining a value and a direction of the initial velocity at the time when the movable device is thrown out; determining a motion trajectory of the movable device (for example, a parabolic trajectory when no power output component outputs power) according to the value and the direction of the initial velocity; and adjusting the image capturing device to align with the starting point of the motion trajectory (that is, to align with the thrower). When determining the motion trajectory, the wind resistance may be considered. Further, a recognition unit, such as a face recognition system, may be used to further assist the image capturing device to align with and recognize the thrower (that is, after initially adjusting the image capturing device to align with the starting point of the motion trajectory, the precise alignment may be achieved by using the recognition unit).

In some embodiments, before the movable device is thrown out, a recognition unit of the movable device may pre-store local (e.g., face) information of the thrower, or an image capturing device of the movable device may capture a partial image of the thrower, and then the partial image may be received by a recognition unit and pre-stored as local information of the thrower; further, after the movable device is controlled to hover, based on the stored local information, a gimbal (the gimbal is equipped with the image capturing device) of the movable device or the orientation of the movable device may be controlled to adjust the image capturing device to search and to align with the thrower for aerial operations such as capturing images or following the thrower.

In some embodiments, referring to FIG. 3, the method may further include S304: the movable device may sense and adjust its own posture. For example, the movable device may detect its own angular velocity and adjust its own spatial posture. Detecting and adjusting the posture of the movable device may be implemented by a gyroscope (for example, a three-axis gyroscope) and a power output component. A gyroscope is a rigid body that rotates around the height of a fulcrum and is mainly used to determine the flight posture. The gyroscope may be a piezoelectric gyroscope, a microcomputer gyroscope, or a laser gyroscope that is configured to measure an angular velocity. The power output component may be a rotor for adjusting the deflection of the movable device.

Figure 4:
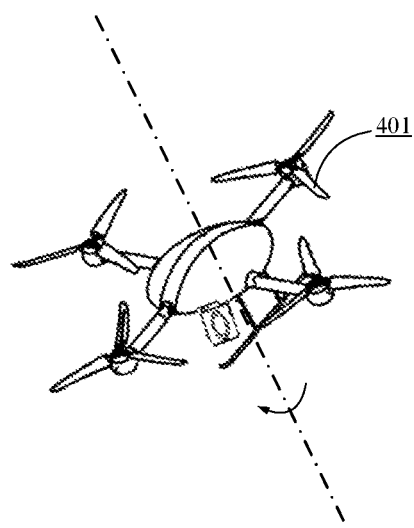
FIG. 4 illustrates a schematic diagram of sensing and adjusting a posture of a movable device according to various embodiments of the present disclosure.

FIG. 4 illustrates a schematic diagram of sensing and adjusting a posture of the movable device in S304 shown in FIG. 3. Referring to FIG. 4, the movable device 401 may be equipped with a gyroscope, and the angular velocity of the movable device 401 detected by the gyroscope may indicate that there is a deflection corresponding to the detected angular velocity. The three-axis gyroscope may transmit the sensed three-axis angular velocity value to a controller of the movable device, and the controller may calculate, corresponding to the deflection, the angle that the power output component needs to adjust, and so on. As such, the deflection may be changed accordingly to achieve the purpose of stabilizing the posture of the movable device.

In some embodiments, the method may further include S306: when or after controlling the movable device to hover, the movable device may perform aerial operations. FIG. 5 illustrates a schematic diagram of hovering and performing an aerial operation in an exemplary operation method of a movable device according to various embodiments of the present disclosure. A movable device, such as a UAV, moves to the air to achieve a series of corresponding functions, which may include but are not limited to throwing a first item (such as jetting or spraying a liquid, a solid, or a liquid-solid mixture) in the air, capturing images and/or recording videos in the air, and fetching a second item in the air. The operations mentioned above can all be referred to as aerial operations. Taking the control of capturing images as an example, a wider and more peculiar field of view can be obtained through an overlooking angle, thereby meeting the corresponding needs of users.

In some embodiments, the movable device 501 may include an image capturing device 5011, and the image capturing device 5011 may perform image capturing after the movable device 501 recognizes a first setting part of the thrower 502. In this case, the hovering position of the movable device 501 may be just suitable for capturing images. After a simple focusing process, for example, after identifying the first setting part (such as a human face) of the thrower 502, the capturing or recording operation may be performed.

In some embodiments, after the movable device 501 moves to a position within a capturable range from where the thrower 502 is able to be captured, the mounted image capturing device recognizes the first setting part of the thrower, the movable device may perform image capturing. In this case, due to an insufficient throwing force and/or an inappropriate angle of the throw operation by thrower 502, the movable device 501 may not reach the appropriate position for capturing images. The position of the movable device 501 may thus be adjusted by the power output component, and after the movable device moves to a position within a capturable range from where the thrower 502 is able to be captured, the operation of capturing images or recording videos may then be performed. In this case, a positioning operation such as a face recognition operation may also be required.

In some embodiments, after the movable device 501 moves to a position within a capturable range from where the thrower 502 is able to be captured, the mounted image capturing device recognizes the first setting part of the thrower, and the angle of the image capturing device is adjusted, the movable device may perform image capturing. In this case, due to an insufficient throwing force and/or an inappropriate angle of the throw operation by thrower 502 and an inaccurately aligned camera angle, the movable device 501 may not reach the appropriate position for capturing images. The position of the movable device 501 may thus be adjusted by the power output component, and after the movable device moves to a position within a capturable range from where the thrower 502 is able to be captured, the operation of capturing images or recording videos may then be performed. In this case, a positioning operation such as a face recognition operation may also be required. In addition, it may also need to mount the image capturing device on a gimbal (the gimbal is mounted on the movable device) or other appropriate apparatus, and then by rotating the gimbal to achieve a change in the angle of the image capturing device.

In some embodiments, the method may further include S307: after the movable device completes the aerial operations, the movable device may move to a position closer to the thrower. That is, the movable device may move toward the thrower. For moving the movable device closer to the thrower, a distance relative to the thrower may be measured in advance, and the movable device may move towards the thrower by driving the power output component.

In some embodiments, the movable device may further include a fourth sensing device that is configured to sense whether the distance between the movable device and a second setting part of the thrower reaches a preset distance. Accordingly, the power output component may be further configured to: after reaching the preset distance, stop the power output. The fourth sensing device may be a distance measuring sensor, such as an ultrasonic sensor, an infrared sensor, or an optical flow sensor. The fourth sensing device may be mounted on the movable device, and may sense the distance to the thrower. When the distance changes and the changed value reaches a certain distance threshold, the power output may be stopped by the controller. In some examples, the fourth sensing device and the second sensing device may each have the same components as the first sensing device, but the sensing time (operation time) may be different. Therefore, a sensing device may be multiplexed as the first sensing device, the second sensing device, and the fourth sensing device within the movable device, that is, only one ultrasonic sensor, one infrared sensor, or one optical flow sensor may need to be disposed in the movable device.

For example, a UAV is used to capture images. After the UAV finishes capturing images, the UAV may use the battery to provide power for the movable device to return back along the original direction. When flying back to the vicinity of the thrower, the thrower may put a hand below the position of the UAV. The fourth sensing device of the UAV (for example, an ultrasonic sensor, an infrared sensor, and/or an optical flow sensor) may sense the presence of a second setting part (for example, a human hand). For example, the fourth sensing device may sense that the distance between the hand and the UAV reaches the preset distance threshold. Further, the movable device may reduce the flying lift, and land on the human hand. In this way, taking off and landing on a human hand may be achieved, such that even when the ground is uneven, the movable device is still able to take off and land.

Figure 6:
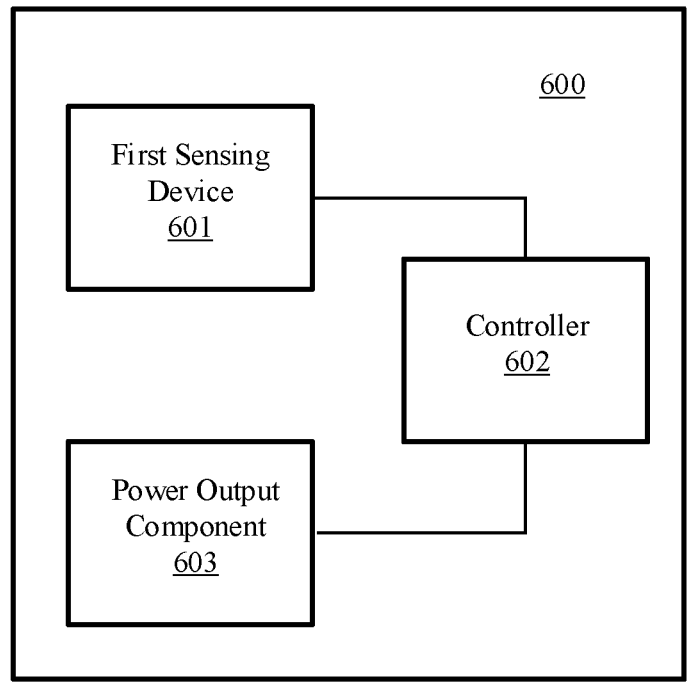
FIG. 6 illustrates a schematic block diagram of an exemplary movable device according to various embodiments of the present disclosure.

FIG. 6 illustrates a schematic block diagram of an exemplary movable device according to various embodiments of the present disclosure. In the following, an exemplary movable device may be described in detail with reference to FIG. 6.

Referring to FIG. 6, the movable device 600 may include: a first sensing device 601 configured to sense whether the movable device is thrown by a thrower; a controller 602 configured to receive a signal transmitted from the first sensing device 601 and indicating that the movable device is thrown out, and generate a control signal; and a power output component 603 configured to make the movable device hover according to the control signal after the movable device is thrown out.

In some embodiments, the first sensing device 601 may be mounted on the movable device to sense the distance to the thrower. The first sensing device 601 may be an ultrasonic sensor, an infrared sensor, and/or an optical flow sensor. For example, the first sensing device 601 may be mounted on a movable device to sense the distance between the movable device and the thrower. When the distance changes and the changed value exceeds a certain distance threshold, it may be determined that the movable device is thrown out by the thrower. In one embodiment, the first sensing device, including the ultrasonic sensor, the infrared sensor, and/or the optical flow sensor, may be located inside the movable device or disposed on an outer casing of the movable device to facilitate sensing the distance.

Similarly, according to another implementation method of the first sensing device 601, the first sensing device 601 may be configured to sense a distance value, the only difference is that the change in the distance between the movable device and the ground may be detected. Correspondingly, the first sensing device 601 may also be an ultrasonic sensor, an infrared sensor, and/or an optical flow sensor.

According to another implementation method of the first sensing device 601, the first sensing device 601 may be configured to sense and determine whether an interaction force exists between the movable device and the thrower. The method may be implemented by a pressure sensor. That is, the first sensing device may be a pressure sensor. For example, the pressure sensor may be disposed on the outer surface of the movable device. Before the movable device is thrown out, the thrower may give the movable device a supporting force or a gripping force, and the pressure sensor may thus sense a corresponding force. After the movable device is thrown out, the interaction force between the thrower and the movable device may disappear, and thus the change may be detected by the pressure sensor in time.

In one embodiment, the pressure sensor may be disposed on the lower surface of the movable device, and thus when the thrower throws out the movable device, the pressure sensor may be able to sensitively detect that the support force disappears.

The controller 602 may be a central control component in the movable device. The controller 602 may be connected with each sensing device and the power output component 603, and may be configured to receive signals from each sensing device, and generate corresponding control signals.

The operation method according to various embodiments of the present disclosure may correspond to a thrower, such as a person, and the corresponding operation may be relatively simple. Users may be able to understand and become familiar with the operation method of a movable device (such as a UAV) by reducing the training time or even without training. Users may only need to have certain throwing skills to make the movable device reach a certain height, and the movable device may then perform aerial operations by itself without requiring any further user control. In addition, after the controlled operation is completed, the disclosed operation method may only require to provide a place where the movable device needs to land, and the movable device can automatically land to the place without further operations to avoid misoperation or error caused by manual operation.

Figure 7:
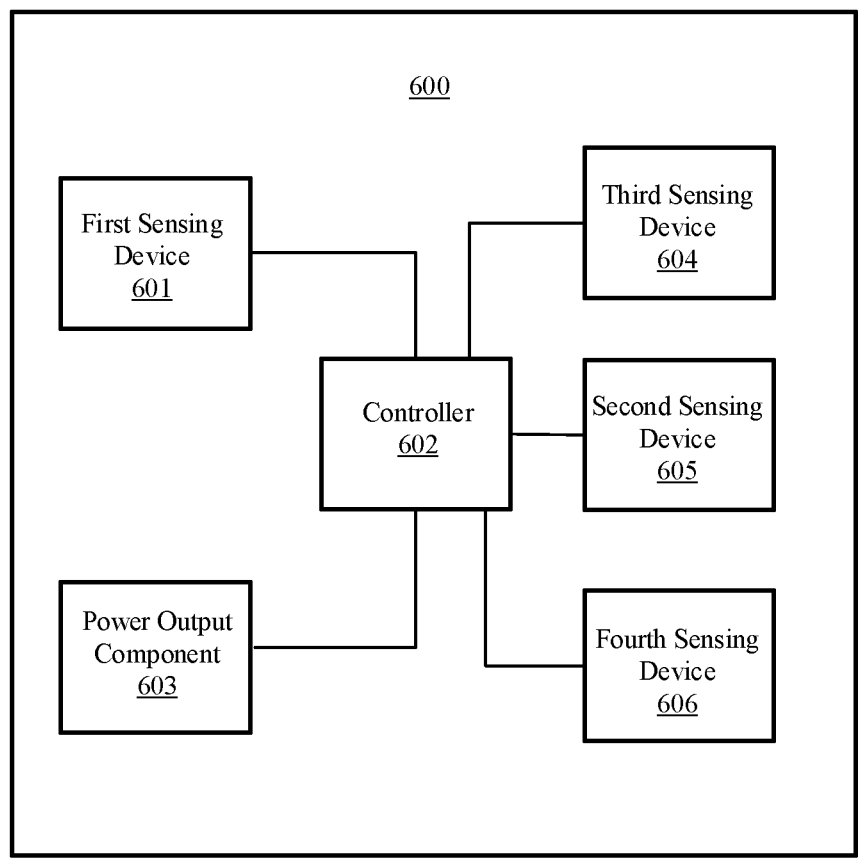
FIG. 7 illustrates a schematic block diagram of another exemplary movable device according to various embodiments of the present disclosure.

FIG. 7 illustrates a schematic block diagram of another exemplary movable device according to various embodiments of the present disclosure. In the following, an exemplary movable device may be described in detail with reference to FIG. 6.

Referring to FIG. 6, in addition to the first sensing device 601, the controller 602, and the power output component 603, the movable device may further include: an image capturing device, which is mounted on the movable device, and is configured to be aligned with the thrower after the movable device is thrown out. For a detail description of the image capturing device, reference may be made to the corresponding content in the embodiments described above, and the details are not repeated herein again. When performing an aerial operation such as capturing images and recording videos, the corresponding operations may be performed by the image capturing device. For the alignment method after the movable device is thrown out, reference may be made to the above description based on FIGS. 1-5, and the details are not repeated herein again.

In some embodiments, the movable device 600 may further include a third sensing device 604 mounted on the movable device for detecting the initial velocity when the movable device 600 is thrown out. The third sensing device 604 may be a speed sensor and an acceleration sensor, and may be configured to detect the value of the initial velocity, the direction of the initial velocity, and the throwing angle relative to the thrower. The speed sensor may measure a linear velocity or an angular velocity, and an acceleration sensor may be used to measure linear acceleration.

In some embodiments, the movable device 600 may further include a releasing device, configured to throw a first item (such as jetting or spraying a liquid, a solid, or a liquid-solid mixture) in the air, capture images and/or record videos in the air, and fetch a second item in the air. Taking the control of capturing images as an example, a wider and more peculiar field of view can be obtained through an overlooking angle, thereby meeting the corresponding needs of users.

In some embodiments, in order to implement image capturing of a specific controlled operation, the movable device may further include a recognition unit for identifying a first setting part of the thrower, and the recognition unit may be any face recognition system according to existing technology. The recognition unit may include four components: a face image acquisition and detection component, a face image pre-processing component, a face image feature extraction component, and a matching and recognition component. The corresponding first setting part of the thrower may be a human face. The movable device may also include a gimbal, mounted on the movable device and equipped with an image capturing device. The gimbal may be configured to adjust the angle of the image capturing device, and the image capturing device may be further configured to, after the image capturing device being aligned with the first setting part of the thrower, capture an image of the thrower.

In some embodiments, the movable device 600 may further include a second sensing device 605 for sensing whether the movable device meets a hovering condition.

In one embodiment, the second sensing device 605 may be an ultrasonic sensor, an infrared sensor, or an optical flow sensor, and may be mounted on the movable device and used to sense whether the height of the movable device no longer rises. The second sensing device may be configured to perform height sensing at a certain frequency. The second sensing device can sense the height relative to the ground or the height relative to the throwing subject. At the operation frequency of the second sensing device, when the height of the next sensing value is less than or equal to the height of the previous sensing value, it may be determined that a hovering condition is satisfied. Due to the uncertainty or mobility of the thrower, the bottom surface may be selected as a reference for height sensing and measurement.

In another embodiment, the movable device may hover after the second sensing device 605 detects that the component of the velocity of movable device in the height direction is 0. In this case, the second sensing device 605 may be a speed sensor and an acceleration sensor, and may be configured to sense whether the component of the velocity of the movable device in the height direction is zero. The speed sensor may measure a linear velocity or an angular velocity, and an acceleration sensor may be configured to measure linear acceleration.

In another embodiment, through the second sensing device 605, the movable device may sense whether a hovering control signal is received from an external control terminal. In this case, the second sensing device may be an external signal receiving device. The external signal receiving device may be electrically coupled to a controller, and when receiving a hovering signal from an external control terminal, the received hovering signal may be transmitted to the controller, and the controller may control a corresponding power output component to perform the hovering operation.

In some embodiments, the movable device 600 may further include a fourth sensing device 606, configured to sense whether the distance between the movable device and a second setting part of the thrower (such as a hand of the thrower) reaches a preset distance. Accordingly, the power output component 603 may be further configured to: after reaching the preset distance, stop the power output. The fourth sensing device 606 may be a distance measuring sensor, such as an ultrasonic sensor, an infrared sensor, or an optical flow sensor. The fourth sensing device 606 may be mounted on the movable device, and may sense the distance to the thrower. When the distance changes and the changed value reaches a certain distance threshold, the power output may be stopped by the controller. In some examples, the fourth sensing device 606 and the second sensing device 605 may each have the same components as the first sensing device 601, but the sensing time (operation time) may be different. Therefore, a sensing device may be multiplexed as the first sensing device 601, the second sensing device 605, and the fourth sensing device 606 within the movable device, that is, only one ultrasonic sensor, one infrared sensor, or one optical flow sensor may need to be disposed in the movable device.

In some embodiments, the power output component 603 may include a motor and a rotor. The motor may be mechanically connected to the rotor, and may drive the rotor to rotate so as to output power to the movable device 600.

The operation method of a movable device according to various embodiments of the present disclosure incorporates a throw operation such that a flat ground, or even a ground with any surface condition, is not required for the movable device to take off. Therefore, energy may be saved. Moreover, after the movable device is self-controlled to hover in the air, the movable device may be able to perform subsequent aerial operations such as capturing images. Because the energy is saved before the movable device enters the hovering state, more energy may be provided for the subsequent aerial operations (for example, it can increase the capturing time or the number of captured images); in addition, by controlling an image capturing device to be automatically aligned with the thrower after hovering, the complexity of operating the movable device may be reduced for the operator and the efficiency of the aerial operation of the movable device may be improved.

According to the various embodiments of the present disclosure, by disposing a first sensing device, a controller, and a power output component in a movable device, the movable device may be able to allow the movable device to reach the position for subsequent aerial operations after being thrown out by a thrower, thereby avoiding the problems caused by taking off from an uneven ground; the movable device may also be equipped with an image capturing device. After the movable device hovers, the image capturing device is automatically aligned with the thrower through a recognition unit or according to a motion trajectory after the movable device is thrown out, and then perform aerial operations (such as capturing images of the thrower). As such, the complexity of operating the movable device may be reduced for the operator and the efficiency of the aerial operation of the movable device may be improved.

Those of ordinary skill in the art may understand that the units and algorithm steps of each example described in combination with the embodiments disclosed herein can be implemented by electronic hardware, or a combination of computer software and electronic hardware. Whether these functions are performed in hardware or software depends on the specific application and design constraints of the technical solution. Those of ordinary skill in the art can use different methods to implement the described functions for each specific application, but such implementation should not be considered to be beyond the scope of this application.

In the various embodiments provided by the present application, it should be understood that the disclosed systems, devices, and methods may be implemented in other manners. For example, the device embodiments described above are merely illustrative. For instance, in various embodiments of the present disclosure, the units are divided or defined merely according to the logical functions of the units, and in actual applications, the units may be divided or defined in another manner. For example, multiple units or components may be combined or integrated into another system, or some features can be ignored or not executed. In addition, the mutual coupling or direct coupling or communication connection shown or discussed may be an indirect coupling or communication connection through some interface, device or unit, and may be in an electrical, mechanical, or other form.

The units described as separate components may or may not be physically separated, and the components displayed as a unit may or may not be physical in a unit, that is, they may be located in one place, or may be distributed to multiple network units. Some or all of the units may be selected according to actual needs to achieve the purpose of the solution of the embodiment.

In addition, each functional unit in each embodiment of the present application may be integrated into one processing unit, or each unit may exist physically separately, or two or more units may be integrated into one unit.

Finally, it should be noted that the above embodiments are merely illustrative of, but not intended to limit, the technical solutions of the present invention; although the present disclosure has been described in detail with reference to the above embodiments, those skilled in the art should understand that the technical solutions described in the above embodiments may be modified, or part or all of the technical features may be equivalently replaced; and the modifications or substitutions do not depart from the scope of the technical solutions of the embodiments of the present disclosure.

What is claimed is:

1. An operation method of a movable device, comprising:
sensing, by the movable device, whether the movable device is thrown out by a thrower;
in response to a sensing of being thrown out, controlling the movable device to hover in air;
after controlling to hover, performing, by the movable device, an aerial operation of the movable device; and
after performing the aerial operation:
controlling the movable device to move towards the thrower; and
after the movable device senses that a distance between the movable device and a hand of the thrower reaches a preset distance, controlling a power output of the movable device to land the movable device at the hand.

2. The method according to claim 1, after the sensing of being thrown out, further including:
aligning an image capturing device that is mounted on the movable device with the thrower.

3. The method according to claim 2, wherein aligning the image capturing device, that is mounted on the movable device, with the thrower includes:
determining a value and a direction of an initial velocity of the movable device when being thrown out;
determining a motion trajectory of the movable device according to the value and the direction of the initial velocity; and
adjusting the image capturing device to align with a starting point of the motion trajectory,
and/or
using a recognition unit to assist the image capturing device to align with the thrower.

4. The method according to claim 2, wherein:
before the movable device being thrown out, a recognition unit of the movable device pre-stores local information of the thrower, or the image capturing device captures a partial image of the thrower, and a recognition unit receives the partial image and pre-stores the partial image as local information of the thrower; and
after the movable device is controlled to hover, based on the local information, a gimbal equipped with the image capturing device or an own orientation of the movable device is controlled to adjust the image capturing device to search and align with the thrower.

5. The method according to claim 1, after the sensing of being thrown out, further including:
detecting an initial velocity of the movable device when being thrown out.

6. The method according to claim 5, wherein detecting the initial velocity of the movable device includes:
detecting a value and a direction of the initial velocity of the movable device; and
detecting a throwing angle of the movable device relative to the thrower.

7. The method according to claim 1, after the sensing of being thrown out, further including:
sensing and adjusting an own posture of the movable device.

8. The method according to claim 7, wherein sensing and adjusting the own posture of the movable device includes:
sensing, by the movable device, an angular velocity of the movable device; and
adjusting a spatial posture of the movable device according to the angular velocity.

9. The method according to claim 1, wherein sensing, by the movable device, whether the movable device is thrown out by the thrower includes at least one of:
the movable device sensing whether a change of a distance between the movable device and the thrower exceeds a first threshold;
the movable device sensing whether an interaction force exists between the movable device and the thrower; and
the movable device sensing whether a change of a distance between the movable device and a ground exceeds a second threshold.

10. The method according to claim 1, wherein after the sensing of being thrown out, controlling the movable device to hover in the air includes:
controlling the movable device to hover, when sensing that:
a height of the movable device no longer rises based merely on a throwing momentum.

11. The method according to claim 1, wherein the aerial operation includes at least one of:
throwing a first item;
capturing images; and
fetching a second item.

12. The method according to claim 11, wherein capturing the images includes one of:
after an image capturing device mounted on the movable device recognizes a first setting part of the thrower, performing the capturing of the images;
after the movable device moves to a position within a capturable range from where the thrower is able to be captured, and an image capturing device mounted on the movable device recognizes a first setting part of the thrower, performing the capturing of the images; and
after the movable device moves to a position within a capturable range from where the thrower is able to be captured, an image capturing device mounted on the movable device recognizes a first setting part of the thrower, and an angle of the image capturing device is adjusted, performing the capturing of the images.

13. The method according to claim 1, wherein controlling the movable device to hover in the air includes at least one of:
- the movable device sensing that its own height is no longer rising;
- the movable device detecting that a component of own velocity in a height direction is zero; and
- the movable device receiving a hovering control signal from an external control terminal.

14. A movable device, comprising:
- a first sensing device, configured to sense whether the movable device is thrown out by a thrower;
- a controller, configured to generate a control signal, after receiving a signal indicating that the movable device is thrown out from the first sensing device; and
- a power output component, configured to make the movable device hover according to the control signal after the movable device is thrown out;
- wherein the controller is further configured to, after performing an aerial operation:
  - control the movable device to move towards the thrower; and
  - after sensing that a distance between the movable device and a hand of the thrower reaches a preset distance, control the power output component to land the movable device at the hand.

15. The device according to claim 14, further including:
- an image capturing device, mounted on the movable device and configured to be aligned with the thrower after the movable device is thrown out.

16. The device according to claim 14, wherein the first sensing device includes at least one of:
- an ultrasonic sensor, an infrared sensor, or an optical flow sensor mounted on the movable device and configured to sense whether the movable device is far away from the thrower, or configured to sense whether the movable device is far away from a ground; and
- a pressure sensor, mounted on a bottom or a side surface of the movable device and configured to sense whether an interactive force exists between the movable device and the thrower.

17. The device according to claim 14, further including;
- a third sensing device, mounted on the movable device and configured to detect an initial velocity of the movable device when the movable device is thrown out.

18. The device according to claim 17, wherein:
- the third sensing device includes a speed sensor and an acceleration sensor, which are configured to detect a value and a direction of the initial velocity when the movable device is thrown out.

* * * * *